United States Patent Office 3,790,504
Patented Feb. 5, 1974

---

3,790,504
PLATINUM-IRIDIUM-ZINC CATALYST FOR THE CONVERSION OF HYDROCARBONS
Pierre Duhaut, Le Vesinet, Jean Guillemat, Chatou, and Jean Miquel, Paris, France, assignors to Institut Francais du Petrole, des Carburants et Lubrifiants, Rueil-Malmaison, France
No Drawing. Filed Feb. 24, 1972, Ser. No. 229,164
Claims priority, application France, Mar. 3, 1971, 7107391
Int. Cl. B01j 11/12, 11/78; C10g 35/08
U.S. Cl. 252—466 PT                                      30 Claims

ABSTRACT OF THE DISCLOSURE

An improved catalyst for carrying out such reactions as reforming, hydrogenation, dehydrogenation, isomerization, aromatization and other hydrocarbon conversions, which comprises platinum and iridium incorporated in a carrier such as alumina, silica, magnesia or alumina-silica and a critical amount of zinc or of a zinc compound.

---

The present invention relates to a new catalyst comprising a carrier, platinum, iridium and zinc or a zinc compound.

The invention also relates to the use of this catalyst in a reforming reaction or in other hydrocarbon reactions such as hydrogenation, dehydrogenation, isomerization or aromatization.

A catalyst containing platinum and iridium is already known, these two metals being deposited on a carrier (U.S. Pat. 2,848,377). However, it has been discovered that, by incorporating in such a catalyst a critical amount of zinc or of a zinc compound, the yield increase in these various hydrocarbon conversion reactions, is greater than that observed when the same critical amount of zinc or zinc compound is incorporated in a catalyst containing only one single noble metal (e.g. platinum). It has been also discovered that the stability of a catalyst comprising a carrier, platinum and iridium considerably increases when a critical amount of zinc or a zinc compound is incorporated therein.

The catalyst according to the invention contains, with respect to the weight of catalyst carrier, from 0.005 to 1% of platinum, from 0.005 to 1% (preferably 0.01–0.09%) of iridium and from 0.005 to 1% of zinc or of zinc compound (expressed as zinc oxide). Preferably the catalyst contains from 0.005 to 0.8% by weight of zinc or of zinc compound (expressed as zinc oxide) with respect to the catalyst carrier.

Optionally the catalyst may also contain from 0.1 to 10% and preferably from 0.2 to 5% by weight, with respect to the catalyst carrier, of a halogen, such as for example chlorine or fluorine.

composable compound of the metal, at a sufficient concentration for obtaining the desired metal content in the final catalyst. After impregnation, the mixture is heated to remove water. As the platinum compound, there is generally used chloroplatinic acid; there can also be used, for example, ammonium chloroplatinate. As the iridium compound, there can be used for example, chloroiridic acid, iridium tribromide, iridium trichloride or ammonium chloroiridate. After impregnation of the carrier with platinum and iridium, the resulting composition is usually centrifuged and then dried by heating to a temperature generally not exceeding 260° C., and thereafter calcined at a temperature which may reach 700° C. As far as the zinc or zinc compound is concerned, it may be added to the carrier before or after the introduction of platinum and iridium, however before the drying and the calcination of the catalyst, or preferably simultaneously with platinum and iridium. The zinc or zinc compound is introduced into the catalyst in the form of an organic or inorganic compound or in the form of a mixture of organic and inorganic compounds.

Among the organic zinc compounds there can be mentioned zinc acetate, zinc formate and zinc caproate; among the inorganic zinc compounds, there can be mentioned the oxides, hydroxides and salts. Among the salts, there will be mentioned the chlorides, bromides, nitrates, nitrites, carbonates, bicarbonates, fluorides, iodides, oxichlorides, sulphates, sulphites, sulphides, phosphates and phosphites; more particularly zinc bromide, zinc chloride, zinc hydroxide, zinc nitrate, zinc sulphate and zinc sulphide.

Reforming is generally conducted at a temperature of from about 450° C. to 580° C., under a pressure in the range of from 5 to 20 kg./cm.², the hourly feed rate being from 0.5 to 10 volumes of liquid charge, i.e. a naphtha distilling in the range of from 60° C. to 220° C., per volume of catalyst.

Hydrogenation is generally conducted at a temperature of from 100 to 500° C., under a pressure of from 1 to 40 kg./cm.².

Isomerization is generally conducted at a temperature of from about 200 to 600° C., under a pressure from about 0.05 to 70 kg./cm.², the hourly feed rate by volume being from 0.1 to 10 times the catalyst volume. Dehydrogenation, e.g. of n-paraffins or aromatization is generally conducted at a temperature of from about 300 to 650° C., under a pressure of from 0.1 to 60 kg./cm.², the hourly feed rate by volume being 0.1 to 20 times the catalyst volume.

The following examples illustrate the invention but are not limitative thereof. In these examples, the zinc content is expressed as zinc oxide.

EXAMPLE 1

9. A final calcined catalyst as defined by claim 4 containing chlorine or fluorine in a proportion of 0.2–5% by weight with respect to the carrier.

10. A final calcined catalyst as defined by claim 5 containing chlorine or fluorine in a proportion of 0.2–5% by weight with respect to the carrier.

11. A final calcined catalyst as defined by claim 1 wherein said zinc or zinc compound is present in a concentration of about 0.1% by weight with respect to the carrier.

12. A final calcined catalyst as defined by claim 2 wherein said zinc or zinc compound is present in a concentration of about 0.1% by weight with respect to the carrier.

13. A final calcined catalyst according to claim 3 further containing a halogen in a proportion of 0.1 to 10% by weight with respect to the catalyst carrier.

14. A final calcined catalyst as defined by claim 11 containing chlorine or fluorine in a proportion of 0.2–5% by weight with respect to the carrier.

15. A final calcined catalyst as defined by claim 12 containing chlorine or fluorine in a proportion of 0.2–5% by weight with respect to the carrier.

16. A final catalyst according to claim 1 wherein said catalyst carrier is alumina.

17. A final catalyst according to claim 2 wherein said catalyst carrier is alumina.

18. A final catalyst according to claim 3 wherein said catalyst carrier is alumina.

19. A final catalyst according to claim 4 wherein said catalyst carrier is alumina.

20. A final catalyst according to claim 5, wherein said catalyst carrier is alumina.

21. A final catalyst according to claim 6 wherein said catalyst carrier is alumina.

22. A final catalyst according to claim 7 wherein said catalyst carrier is alumina.

23. A final catalyst according to claim 8 wherein said catalyst carrier is alumina.

24. A final catalyst according to claim 9 wherein said catalyst is alumina.

25. A final catalyst according to claim 10 wherein said catalyst carrier is alumina.

26. A final catalyst according to claim 11 wherein said catalyst carrier is alumina.

27. A final catalyst according to claim 12 wherein said catalyst carrier is alumina.

28. A final catalyst according to claim 13 wherein said catalyst carrier is alumina.

29. A final catalyst according to claim 14 wherein said catalyst carrier is alumina.

30. A final catalyst according to claim 15 wherein said catalyst carrier is alumina.

References Cited

UNITED STATES PATENTS

| 2,500,146 | 3/1950 | Fleck et al. | 260—668 |
| 2,777,805 | 1/1957 | Lefrancois et al. | 208—139 |
| 2,848,377 | 8/1958 | Webb | 208—139 |
| 3,109,038 | 10/1963 | Myers | 260—671 |

FOREIGN PATENTS 771,313   3/1957   Great Britain.

PAUL M. COUGHLAN, Jr., Primary Examiner

S. L. BERGER, Assistant Examiner

U.S. Cl. X.R.

208—138, 139, 143; 252—441, 455 R, 457, 473; 260—668 A, 683.3

United States Patent Office 3,790,505
Patented Feb. 5, 1974

3,790,505
LOW TEMPERATURE METHANOL SYNTHESIS CATALYST
Thomas D. Casey, Fern Creek, and George M. Chapman, Louisville, Ky., assignors to Catalysts and Chemicals, Inc., Louisville, Ky.
No Drawing. Continuation-in-part of abandoned application Ser. No. 787,234, Dec. 26, 1968. This application May 4, 1971, Ser. No. 140,244
Int. Cl. B01j *11/22*
U.S. Cl. 252—463    12 Claims

ABSTRACT OF THE DISCLOSURE

Until recently low temperature methanol synthesis catalysts have been virtually unknown. A zinc, copper and chromium catalyst has been used as a low temperature methanol synthesis catalyst, but alumina has been discounted as having no practical interest as an ingredient in a methanol synthesis catalyst. However, under certain conditions alumina can be used to advantage in such catalysts.

BACKGROUND OF THE INVENTION

This application is a continuation-in-part of application Sea. No. 787,234, filed Dec. 26, 1968, now abandoned.

This invention relates to the production of methanol and particularly to catalysts for the process.

On an industrial scale methanol is generally prepared by the reaction of oxides of carbon with hydrogen. It has been the practice to react carbon monoxide or carbon dioxide with hydrogen using copper or rare earth metal catalysts and temperatures in the range of 570° F. to 750° F. Mixed catalysts containing zinc have also been very successfully used in methanol synthesis. For instance combinations of zinc and chromium have long been considered among the better methanol catalysts.

Because of equilibrium values, when the reaction of the carbon oxide and hydrogen is conducted at a temperature of 570° F. to 750° F., it is necessary to carry out the reaction at high pressures in order to obtain suitable yields. Thus at these tempertaures and 200 atmospheres the product contains only 2.4 percent methanol. At 300 atmospheres this yield is about doubled. In addition higher temperatures and pressures appear to favor the formation of higher molecular weight oxygenated hydrocarbons. In fact with a zinc oxide-chromium oxide catalyst it is possible to obtain high purity methanol only at process temperatures below about 735° F. Side reactions increase when the process is carried out above this temperature. Nevertheless until recently low temperature methanol synthesis catalysts have been virtually unknown.

If the methanol synthesis reaction is carried out at what are considered to be low temperature conditions for the process, that is 400° F. to 560° F., there is a resulting approach to more favorable equilibrium conditions. However many high temperature methanol catalysts possess such low activities at low temperatures that they cannot be employed in the lower temperature reactions. Other high temperature methanol synthesis catalysts exhibit good initial activities but have very poor catalyst lives. Hence most high temperature methanol synthesis catalysts cannot be used in low temperature synthesis processes.

An excellent treatment of the synthesis of methanol under high temperature conditions appears in Catalysis, vol. III, Emmett, Reinhold, 1955. In this treatise G. Natta reviews the work which has been done with various catalysis, particularly zinc oxide, copper oxide, and chromium oxide, concluding that catalysts of industrial importance for synthesis of methanol are composed of mixtures of two or more oxides such as zinc oxide and chromium oxide, zinc oxide and magnesium oxide, or zinc oxide and copper oxide. Natta points out that whereas zinc, copper and chromium are considered very active for the synthesis of methanol these catalysts have poor resistance to aging and are highly sensitive to poisons. Such catalysts can, however, be used as low temperature methanol catalysts as shown in U.S. 3,326,956.

SUMMARY OF THE INVENTION

In accordance with the practice of this invention it has been found that catalysts can be made which are particularly resistant to loss of activity, and which also have the necessary strength properties. Compositions which can be reduced to form low temperature methanol synthesis catalytsts having particularly long lives can be made with copper oxide, zinc oxide, and alumina mixture if the compositions are prepared by a procedure contemplated herein. The weight ratio of zinc oxide to copper oxide, based on metals, is one-half zinc to one copper up to three zinc to one copper, and the dried, i.e., unreduced, compositions contain 5 to 45 percent $Al_2O_3$ which confers increased thermal stability on the finished catalyst and leads to the formation of a pure product.

DETAILED DESCRIPTION OF THE INVENTION

In his discussion of ternary methanol synthesis catalysts Natta observed that alumina favors the dehydration reaction of methanol to give dimethyl ether. Therefore zinc oxide and alumina catalysts are said to have no practical interest. In view of these teachings it would appear that catalysts containing zinc oxide, copper oxide and alumina would also be ineffective low temperature methanol synthesis catalysts, and this proved to be the case. However, according to this invention, if prepared by adherence to certain desiderata, an extremely effective low temperature methanol synthesis catalyst can be made containing zinc, copper and alumina which retains its activity and strength properties sufficiently long to be effective commerically for the process.

Considering now these desiderata, it is important that the zinc oxide and the copper oxide each be made from the carbonate. The zinc and copper carbonates can be made by precipitating soluble zinc and copper salts with an alkali metal carbonate, for instance by the addition of zinc and copper nitrates to a sodium carbonate solution. Desirably the carbonates, i.e., compounds composed of carbonate and hydroxides commonly called basic carbonates, can be concomitantly precipitated by the addition of a solution containing a mixture of the soluble zinc and copper salts, say the nitrates, in the proper zinc to copper ratio to a sodium or other alkali metal carbonate solution. Preferably the zinc and copper carbonates are made from the soluble copper and zinc tetra ammine carbonates. However di and tri ammine carbonates can also be made. The zinc or the copper ammine complex is then heated for a period of time sufficient, at a temperature in the range of 160° F. to 210° F., to liberate ammonia and unreacted carbon dioxide, forming the water insoluble basic carbonates. When this method is used, it is also preferred to form the zinc and copper carbonates as a mixture by concomitant precipitation, the aqueous solution of the mixture of copper and zinc ammine complexes being heated to form the carbonate precipitate. After the copper and zinc carbonate suspension are formed, whether separately, mixed, or concomitantly precipitated, the water is eliminated. The carbonates are then dried. The carbonates themselves are not mixed with alumina and then converted to the oxides. Rather it is necessary that the carbonates be heated to form the oxides before mixing with alumina.

Perhaps the most important facet of the preparation of the catalysts contemplated herein is that of the mixing of the zinc and copper oxides with the alumina.

More than mere mixing is involved since neither dry mixing nor wet mixing using ball mill produces a suitable catalyst. However, if (a) an aqueous suspension of the alumina is formed first, and (b) the copper and zinc oxides are completely mixed with the alumina in this medium an effective low temperature methanol synthesis catalyst results. The zinc and copper oxides are incorporated in the suspension using a sufficiently large quantity of water so that the resulting or final suspension of the zinc oxide, copper oxide and alumina contains no more than 20 percent solids, i.e. no more than 20 percent by weight of the three oxides.

A desirable catalyst results when the aqueous suspension is first formed, and dry copper oxide and zinc oxide, as decomposition products of carbonates are completely mixed into the alumina suspension. Nevertheless the catalyst is further improved if a slurry of the zinc and copper oxides is also formed. This suspension of the zinc and copper oxides is then combined with suspension of alumina, the water employed in making each suspension being an amount such that the final suspension contains no less than 80 percent water.

It has been pointed out that the final suspension of copper oxide, zinc oxide, and alumina is mixed completely, i.e. it is agitated sufficiently so that the dispersed oxides do not settle in two hours. The catalyst can be still further improved if the final suspension is homogenized, that is subjected to shearing force to form a homogenous dispersion, an extremely effective low temperature methanol synthesis catalyst can be made. It is possible that the shearing action improves the catalyst by generating new catalyst surfaces, apparently then creating, through chemisorption, a polar condition which leads to coupling during calcination. Methods of high shear mixing are well known, the shearing force being applied by rotary blades, discs, or paddles for instance in Eastern Cowles, Waring and Hockmeyer mixers. If homogenized, the shearing forces will form oxides having an average particle size smaller than 1 micron, usually an average particle size of about 0.2 to 0.3 micron. The properties of mixtures with a solids level appreciably above 20 percent render them difficult to homogenize without generating excessive heat, tending to lower the activity of the catalyst.

After either turbine mixing or homogenization the catalyst is dried and formed into the desired pellets. It will also be reduced prior to use. The reduction is best, effected with a dilute hydrogen or carbon monoxide stream under mild conditions, so controlled that there is no rapid temperature rise. Preferably the temperature should stay above 300° F., but it should not rise above 650° F. The formation of the catalyst of this invention can perhaps best be understood from specific preparations.

EXAMPLE 1

To 4450 grams of a zinc nitrate solution (9.0% Zn by weight) were added 1320 grams of cupric nitrate solution (15.2% Cu by weight). This solution of zinc and copper nitrates was added to sufficient sodium carbonate solution at 140° F. to precipitate the zinc and copper. The resulting green cake of zinc and copper basic carbonates was filtered, washed, dried and calcined (650° F. to 750° F.) to form a mixture of zinc oxide and copper oxide. In a Waring blender 320 parts by weight of alumina trihydrate in 1920 parts of water by weight were intimately mixed with 480 parts by weight of the mixture of zinc and copper oxides in 1920 parts of water under homogenization conditions for 15 to 20 minutes. This mixture was then dried to tabletting moisture, tabletted and calcined (650° F. to 750° F.).

EXAMPLE 2

To 1880 ml. (12.02 gm. Zn/100 ml. soln.) of zinc tetra ammine carbonate dissolved in 3582 ml. of water 1038 ml. (10.6 gm. Cu/100 ml. soln.) of copper tetra ammine carbonate were stirred in until dissolved. To bring about the decomposition of the ammine carbonates and precipitate copper and zinc carbonates, the solution was heated (160° F. to 195° F.) 4.5 hours. The resulting precipitate of copper and zinc basic carbonates was then filtered, washed, dried and calcined (650° F. to 700° F.) to form a mixture of zinc oxide and copper oxide. 198 grams of zinc and copper oxides thus prepared were added to 152 gm. by weight of alumina trihydrate along with 39 gm. by weight of alumina monohydrate (in a 23.6 percent by weight slurry of alumina monohydrate) in 300 gm. of water. In a Waring blender the three oxides were intimately mixed under homogenization conditions for 15 to 20 minutes. This mixture was then dried to tabletting moisture, tabletted and calcined (650° to 750° F.). The resulting composition had a surface area of 191 m.$^2$/gm.

EXAMPLE 3

Following Example 2 a catalyst precursor was made using 1240 ml. (21.5 gm. Zn/100 ml. soln.) of zinc tetra ammine carbonate dissolved in 6470 gm. of water and combined with 2300 ml. (5.8 gm. Cu/100 ml. soln.) of copper tetra ammine carbonate. After conversion to the oxides, the resulting oxides were added to 523 gm. of alumina trihydrate in 3794 gm. of water. After homogenization and tabletting the resulting composition had a surface area of 137 m.$^2$/gm. and a density of 67.1 lbs./ft.$^3$.

EXAMPLE 4

Following Example 2 a catalyst precursor was made by combining a solution of 2580 gm. (10.4 gm. Zn/100 ml. soln.) of zinc tetra ammine carbonate dissolved with 1320 ml. (10 gm. Cu/100 soln.) by weight of copper tetra ammine carbonate. After conversion to the oxides, the oxides formed were added to 134.6 gm. by weight of alumina trihydrate in 276 parts of water by weight. The composition was then homogenized, dried and tabletted. The final composition had a density of 68.6 pounds per cubic foot.

EXAMPLE 5

The process of Example 3 when operated on a continuous basis resulted in a catalyst precursor having a surface area of 170 m.$^2$/gm. and a density of 56.6 lbs./ft.$^3$.

EXAMPLE 6

Following the procedure of Example 1, and using the same quantities of ingredients, copper oxide and zinc oxide were prepared. Rather than using a Waring blender the 320 parts by weight of alumina trihydrate were subjected to the shearing forces of a turbine mixer with 1920 parts by weight of water for 15 minutes. A similar suspension was prepared with the zinc and copper oxides and 1920 parts by weight of water. The two suspensions were then combined and shear mixed for one-half hour in a turbine mixer.

EXAMPLE 7

A catalyst was made following Example 6 except that the copper and zinc oxides were made by the procedure of Example 2. The quantities of reactants employed were those used in Example 2.

EXAMPLE 8

A catalyst was made following Example 7 except that all of the water was mixed with the alumina trihydrate, and the copper oxide and zinc oxide were added to this suspension in their dry states.

In Table A are given results of activity and stability tests run with the foregoing compositions after they were reduced with a CO, CO$_2$, and H$_2$ gas mix and heat removal means to keep the temperature below 500° F. The activities of these catalysts are reported in terms